United States Patent

[11] 3,624,200

| [72] | Inventor | Robert B. Moffett<br>Kalamazoo, Mich. |
|---|---|---|
| [21] | Appl. No. | 384,246 |
| [22] | Filed | July 21, 1964 |
| [45] | Patented | Nov. 30, 1971 |
| [73] | Assignee | The Upjohn Company<br>Kalamazoo, Mich.<br>Continuation-in-part of application Ser. No. 39,781, June 30, 1960, now abandoned, and a continuation-in-part of 62,563, Oct. 14, 1960, now abandoned. This application July 21, 1964, Ser. No. 384,246 |

[54] CONTROLLING PERSPIRATION ON HUMAN SKIN WITH SCOPOLAMINE ESTERS
7 Claims, No Drawings

[52] U.S. Cl. .................................................. 424/65,
424/DIG. 5, 424/38, 424/47, 424/66, 424/67,
424/68, 424/69
[51] Int. Cl. ......................................................... A61k 7/00
[50] Field of Search ............................................. 167/90 A;
424/65

[56] References Cited
UNITED STATES PATENTS
2,814,623  11/1957  Moffet ........................ 424/256 X

OTHER REFERENCES

Moffett II, Journal of the American Chemical Society, Vol. 78, 1956, pp. 3,448– 3,453

Klarman, Drug and Cosmetic Industry, Vol. 81, No. 2, Aug. 1957, pp. 176– 178, 246 and 247

*Primary Examiner*—Jerome D. Goldberg
*Assistant Examiner*—Vera C. Clarke
*Attorneys*—Joseph K. Andonian, John Kekich and Roman Saliwanchek

ABSTRACT: This invention relates to compositions for controlling perspiration odors on human skin by scopolamine esters or physiologically acceptable acid addition salts thereof dispersed in topical carriers.

CONTROLLING PERSPIRATION ON HUMAN SKIN WITH SCOPOLAMINE ESTERS

This application is a continuation-in-part of applications, Ser. Nos. 39,781, filed June 30, 1960 and Ser. No. 62,563, filed Oct. 14, 1960; both now abandoned.

COMPOSITION OF MATTER AND PROCESS

This invention relates to compositions for controlling perspiration odors and to a method for using such compositions. More particularly, this invention pertains to compositions containing scopolamine esters or physiologically acceptable acid addition salts thereof as principal active ingredients dispersed in topical carriers and to a method for the use of such compositions.

The scopolamine esters hereof are identified by the following formula:

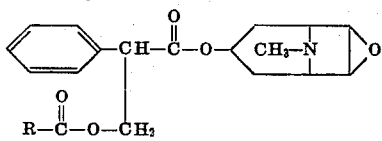

wherein R is H or an alkyl group having one through 12 carbon atoms. The preparation of the scopolamine esters and acid addition salts thereof has been described by Moffett and Aspergren, J. Am. Chem. Soc. 78:3448 (1956), and in U.S. Pat. No. 2,814,623. As described and exemplified in the literature reference and patent, scopolamine free base or the desired acid addition salt thereof is reacted with the appropriate aliphatic acid, acid anhydride or acid halide to give the corresponding scopolamine ester as the free base or acid addition salt. The aliphatic groups of the acids, anhydrides and halides for the said reaction can be either straight or branched chain. Thus, reaction with such acids as formic, acetic, propionic, butyric, valeric, hexanoic, heptanoic, octanoic, nonanoic, decanoic, undecanoic, pivalic, isovaleric, 2-ethylbutyric, 2-ethyl-3-methylbutyric, 3-methylpentanoic, 3,4-dimethylpentanoic, 2-ethylhexanoic, 3-ethyl-4-methylhexanoic, 2-ethyl-4-methylheptanoic 3-propyl-4-methylheptanoic, 2-methyl-3,4-diethylheptanoic acid and the like, or the corresponding anhydrides or halides, is productive of the corresponding scopolamine esters or ester halides. If desired, where the free base ester is obtained, the acid addition salt thereof can be prepared in the usual manner by contacting the scopolamine ester with the appropriate acid. Among the acid addition salts of particular importance are the hydrochloride, hydrobromide, sulfate, acetate, citrate, nitrate, phosphate, benzoate, p-toluenesulfonate, salicylate, propionate, tartrate, succinate, glycolate, nicotinate malate, maleate, lactate and the like.

The compositions of this invention utilize the property of scopolamine esters and physiologically acceptable acid addition salts thereof to inhibit the secretion and excretion of substances which, unless counteracted or removed, give rise to offensive odors, and the property of such compounds to provide maximum assurance, alone or in combination with known deodorant materials, of freedom from such odors. Of special importance is the extended period of time following a single application during which representative compositions have been found to remain effective in actual tests on humans. It is significant, if undesirable systemic side effects are to be avoided, that active ingredients of the present type possess a high degree of effectiveness without being removed from the local areas of application by the circulatory system. The direct, selective inhibition of the initiating factor behind perspiration odors has long been sought as the ideal solution to this problem. Since the mechanism of action of topically effective antiperspirants is not clearly understood, safe and effective antiperspirants are discovered empirically by submitting selected compounds to routine clinical trials on human skin. The unusual effectiveness of the present active ingredients was discovered in such routine clinical trials of representative salts.

The method of this invention comprises the topical application of scopolamine esters of physiologically acceptable acid addition salts thereof as the principal active ingredient, dispersed in any of the conventional cosmetic or pharmaceutical carriers intended for topical use. The only limitation on such carriers is compatibility with the active ingredients and adaptability to the intended purpose. Frequence of application depends on individual needs which, of course, are closely related to the individual's activities and environment. Each application can be expected to produce an antiperspirant effect.

The concentration of scopolamine ester or acid addition salt employed herein should be consistent with the requirements of efficacy, safety and economy. These requirements can be met with extremely small amounts of active ingredient, e.g., a small but perceptible amount less than about 0.1 percent by weight. As indicated heretofore, the present compositions can include the aforementioned principal active ingredients either alone or in combination with other active materials. Accordingly, other antiperspirants such as the aluminum salts, zinc salts and zirconium salts (e.g., the chlorides, chlorhydroxides and sulfates) in concentrations of from about 5 to about 20 percent can be employed as supplementary active ingredients. Additionally, combinations of the said principal active ingredients with antibacterial agents suitable for topical deodorant use offer a balanced approach to the problem. Such combinations include substances capable of minimizing bacterial action on available organic secretions in the affected areas, thereby supplementing the primary activity. The known antibacterials with demonstrated effectiveness in this function are appropriate for use in the present compositions, these ingredients including in particular the antibiotics such as neomycin (0.2–2%), gramicidin (0.25–1%) and tyrothricin (0.5–2%). Also contemplated are the bisphenols, especially hexachlorophene (0.5–2%), bisthionol (0.5–2%), methyl, propyl or butyl parabens (0.2–0.3%), dimethylthiuram disulfide (0.5–2%) and S-ethoxycarbonyl-N-N-dimethyldithiocarbamate.

Carriers into which the active ingredients can be incorporated to produce satisfactory antiperspirant compositions, as indicated heretofore, are those commonly employed for topical application of cosmetics or pharmaceuticals. Such carriers or vehicles include lotions, ointments, aerosols, water solutions, creams (preferably of the oil-in-water type), pulverulent mixtures, gelled sticks and the like. Depending on the physical nature of the vehicle or carrier employed, the method of this invention can be practiced by applying such compositions topically from a roll-on applicator, with the fingers, by a brush or pad, by sprinkling on the skin, from a squeeze bottle, by spraying under propellant pressure, and in other manners according to the particular type of carrier employed.

In preparing the desired pharmaceutical form of the present compositions, various additives, diluents and adjuvants can be utilized. These illustratively include perfumes, essential oils, surfactants (e.g., polysorbate 80, polyoxyethylene sorbitan trioleate, sodium lauryl sulfate, sodium cetyl sulfate), emulsifiers e.g., glyceryl monostearate-diethylaminoethyl alkyl amide phosphate, isopropyl myristate, cetyl alcohol, glyceryl and glycol esters of stearic acid), alcohols (e.g., ethanol and isopropanol), glycols (e.g., propylene glycol, glycerol, sorbitol), ointment-type bases (e.g., spermaceti, carbowaxes, beeswax), higher fatty acids (e.g., stearic acid, palmitic acid), propellants (e.g., halogenated hydrocarbons, carbon dioxide, nitrogen), silicone-type fluids (e.g., polysiloxane fluid), and solid diluents (e.g., calcium carbonate, starch, bentonite, talc).

The following examples set forth the best mode contemplated by the inventor for carrying out this invention, but they are not to be construed as limiting the scope thereof.

Example 1 Lotion (oil-in-water type)

The following illustrates the preparation of 20 liters of a standard lotion;

| Each ml. contains | |
|---|---|
| 2 mg. Methylparaben USP | 40 gm. |
| 3 mg. n-Butyl-p-hydroxybenzoate | 60 gm. |
| 25 mg. Propylene glycol USP | 500 gm. |
| 20 mg. Polysorbate 80 USP | 400 gm. |
| 25 mg. Glyceryl monostearate-diethylaminoethyl alkyl amide | 500 gm. |
| 10 mg. Spermaceti USP | 200 gm. |
| 20 mg. Polysiloxane fluid (No. 555 Dow Corning) | 400 gm. |
| 1 mg. Scopolamine pivalate hydrochloride | 20 gm. |
| 5 mg. Perfume | 100 gm. |
| q.s. Deionized water | q.s. ad 20 liters |

The methylparaben and n-butyl-p-hydroxybenzoate are dissolved in the propylene glycol. To 9 liters of deionized water heated to from 70° to 80° C. is added the propylene glycol solution, polysorbate 80, glyceryl monostearate-diethylaminoethyl alkyl amide, spermaceti and polysiloxane fluid. The temperature of the mixture is maintained at from 70° to 80° C. for 30 minutes and then allowed to cool spontaneously to from 35° to 45° C. The scopolamine pivalate hydrochloride is dissolved in 7 liters of deionized water and added to the cooled mixture. The perfume and sufficient water to make 20 liters are added and the mixture stirred, strained, and put through a homogenizer. After homogenization, the lotion is stirred slowly to remove any entrapped air and then placed in a suitable container.

This lotion is suitable for packaging with a propellant, for example, in a sprayer-type container with dichlorodifluoromethane and dichlorotetrafluoroethane. The lotion can also be packaged in a container with a roll-on or ball-point-type applicator for direct application to the human skin for antiperspirant effect.

Example 2 Pulverulent mixture

The following illustrates the preparation of 5,000 g. of a pulverulent mixture suitable for general topical application to the body:

| Scopolamine acetate hydrobromide | 5 gm. |
|---|---|
| Calcium carbonate, powdered | 150 gm. |
| Talc | 4,845 gm. |
| Perfume | q.s. |

The powdered ingredients are mixed thoroughly and the perfume blended gradually into the mixture of the powders.

Example 3 Pulverulent mixture

The following illustrates the preparation of 10,000 g. of another pulverulent mixture especially suitable for topical application to the feet:

| Starch, fine | 300 gm. |
|---|---|
| Talc, fine | 9,695 gm. |
| Scopolamine 2-ethylbutyrate hydrobromide | 5 gm. |
| Essential oils | q.s. |

The fine and powdered ingredients are mixed thoroughly. The essential oils are blended intimately with the mixed powders.

Example 4 Water Solution

The following illustrates the preparation of 25,000 ml. of an aqueous solution suitable for topical application to the body with a brush or pad:

| Scopolamine isovalerate hydrobromide | 12.5 gm. |
|---|---|
| Polyoxyethylene sorbitan monooleate | 25 gm. |
| Perfume | 25 gm. |
| Deionized water | q.s. ad 25,000 ml. |

The scopolamine isovalerate hydrobromide is dissolved in about 90 percent of the water to be used. The mixed monooleate and the perfume are added slowly with vigorous stirring. The solution is then made up to volume and is ready for topical application to the human body for antiperspirant effect.

Example 5 Cream (oil-in-water type)

The following illustrates the preparation of 100 lbs. of cream:

| Mixture I | |
|---|---|
| Cetyl alcohol | 1.2 lbs. |
| Polyoxyethylene stearate (Atlas G-2151) | 3.0 lbs. |
| Stearic acid | 10.0 lbs. |
| Propylene glycol | 4.0 lbs. |
| Mixture II | |
| Magnesium aluminum silicate (Veegum) | 2.0 lbs. |
| Deionized water | 54.8 lbs. |
| Mixture III | |
| Scopolamine 2-ethyl-3-methylbutyrate hydrobromide | 0.01 lb. |
| Water | 25.0 lbs. |

The ingredients of mixture I are heated together to about 70° C. until melted together. Mixture II is prepared by adding the silicate to the water and stirring until uniformly suspended. Mixture II is intimately blended with mixture I until smooth and then allowed to cool. The ingredients of mixture III are added to the smooth, cooled mixture of I and II. The whole is mixed until thoroughly dispersed and then homogenized. Such a cream can be applied to the skin with the fingers.

Example 6 Viscous lotion

The following illustrates the preparation of 10 liters of a viscous lotion suitable for topical application from a squeeze bottle:

| Each ml. contains | |
|---|---|
| 50 mg. Propylene glycol USP | 500 gm. |
| 2 mg. Methylparaben USP | 20 gm. |
| 3 mg. n-Butyl-p-hydroxybenzoate | 30 gm. |
| 20 mg. Polysorbate 80 USP | 200 gm. |
| 80 mg. Glyceryl monostearate-diethylaminoethyl alkyl amide | 800 gm. |
| 35 mg. Spermaceti USP | 350 gm. |
| 1 mg. Scopolamine 3-methylvalerate | 10 gm. |
| 10 mg. Neomycin sulfate USP | 100 gm. |
| 3 mg. Perfume | 30 gm. |
| Deionized water | q.s. ad 10 liters |

The methylparaben and n-butyl-p-hydroxybenzoate are dissolved in 4½ liters of deionized water and the solution heated to from 70° to 80° C. To this solution the propylene glycol, polysorbate 80, glyceryl monostearate-diethylaminoethyl alkyl amide, and spermaceti are added. The temperature of the mixture is maintained at from 70° to 80° C. for 30 minutes and then allowed to cool to 35° to 45° C. The scopolamine 3-methylvalerate is dissolved in 3 liters of deionized water and added together with the neomycin sulfate. The perfume is then added with additional deionized water to make up the volume to 10 liters. The mixture is strained and put through a homogenizer.

Example 7 Cream (oil-in-water type)

The following illustrates the preparation of 10 kg. of cream:

| Each gm. contains: | |
|---|---|
| 2 mg. Methylparaben USP | 20 gm. |
| 3 mg. n-Butyl-p-hydroxybenzoate | 30 gm. |
| 50 mg. Propylene glycol USP | 500 gm. |
| 20 mg. Polysorbate 80 USP | 200 gm. |
| 90 mg. Glyceryl monostearate-diethylaminoethyl alkyl amide | 900 gm. |
| 40 mg. Spermaceti USP | 400 gm. |
| 0.25 mg. Scopolamine 3-ethyl-4-methylhexanoate succinate | 2.5 gm. |
| 5 mg. Hexachlorophene | 50 gm. |
| 3 mg. Perfume | 30 gm. |
| Deionized water | q.s. ad 10 kg. |

The methylparaben and n-butyl-p-hydroxybenzoate are dissolved in the propylene glycol. To 4 liters of deionized water heated to from 70° to 80° C. is added the propylene glycol solution, polysorbate 80, glyceryl monostearate-diethylaminoethyl alkyl amide, and spermaceti. The temperature of the mixture is maintained at 70° to 80° C. for 30 minutes and then allowed to cool to from 35° to 45° C. The scopolamine 3-ethyl-4-methylhexanoate succinate and hexachlorophene are dissolved in 2½ liters of deionized water and added to the cooled mixture. The perfume and additional water to make 10 kg. are added.

Example 8 Stick

The following illustrates the preparation of 1,000 sticks suitable for topical application, especially to the axilla:

| | |
|---|---|
| Scopolamine propionate hydrochloride | 20 gm. |
| Specially denatured alcohol (U.S. No. 39c) | 17,000 gm. |
| Sodium stearate | 2,300 gm. |
| Sorbitol solution, N.F. | 1,840 gm. |
| Stearyl alcohol | 225 gm. |
| Perfume | q.s. |

The denatured alcohol is placed in a round-bottomed flask fitted with a reflux condenser and stirrer. The scopolamine propionate hydrochloride is added and the whole warmed to about 70° C. The sorbitol solution and sodium stearate are added and warming is continued until solution is complete. The stearyl alcohol is then added and dissolved. The perfume is added and the whole stirred until homogeneous. The warm homogeneous mixture is then poured into individual molds to form the sticks, each stick weighing approximately 1½ ounces.

Example 9

To the compositions of examples 1 through 8 above there can be added, as supplementary active ingredients, effective amounts of known deodorants or other antiperspirants, such as the aluminum salts (e.g., aluminum chloride, aluminum chlorhydroxide), zinc salts (e.g., zinc chloride), zirconium salts (e.g., zirconium chloride), or antibiotics (e.g., neomycin sulfate or free base, gramicidin, tyrothricin and the like.

Example 10

In each of the foregoing examples 1 through 9 there can be substituted for the principal active ingredient equivalent amounts of other scopolamine esters of physiologically acceptable acid addition salts as hereinbefore described.

What is claimed is:

1. A method for controlling perspiration which comprises: topically applying a composition including, as the principal active ingredient, a small but perceptible amount less than about 0.1 percent of a compound selected from the group consisting of (1) scopolamine esters of the formula

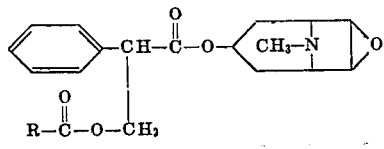

wherein R is selected from the group consisting of hydrogen and alkyl having one through 12 carbon atoms, and (2) physiologically acceptable acid addition salts thereof, dispersed in a topical carrier.

2. A method for controlling perspiration which comprises: topically applying a small but perceptible amount less than about 0.1 percent scopolamine pivalate hydrochloride, dispersed in a topical carrier.

3. A method for controlling perspiration which comprises: topically applying a small but perceptible amount less than about 0.1 percent scopolamine acetate hydrobromide, dispersed in a topical carrier.

4. A method for controlling perspiration which comprises: topically applying a small but perceptible amount less than about 0.1 percent scopolamine isovalerate hydrobromide, dispersed in a topical carrier.

5. A method for controlling perspiration which comprises: topically applying a small but perceptible amount less than about 0.1 percent scopolamine 2-ethylbutyrate hydrobromide, dispersed in a topical carrier.

6. A method for controlling perspiration which comprises: topically applying a small but perceptible amount less than about 0.1 percent scopolamine 2-ethyl-3-methylbutyrate hydrobromide, dispersed in a topical carrier.

7. method for controlling perspiration which comprises topically applying to human skin a composition comprising, as the principal active ingredient, a small but perceptible amount less than about 0.1 percent of a compound selected from the group consisting of (1) scopolamine esters of the formula

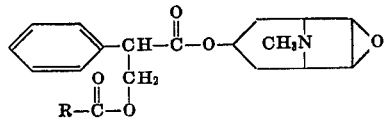

wherein R is alkyl having one through 12 carbon atoms, and (2) physiologically acceptable acid addition salts thereof, dispersed in a topical carrier.

* * * * *

UNITED STATES PATENT OFFICE
CERTIFICATE OF CORRECTION

Patent No. 3,624,200          Dated November 30, 1971

Inventor(s) Robert B. Moffett

It is certified that error appears in the above-identified patent and that said Letters Patent are hereby corrected as shown below:

Column 5, line 43, for "$CH_3$" read -- $CH_2$ --. Column 6, line 25, for "method" read -- A method --.

Signed and sealed this 13th day of June 1972.

(SEAL)
Attest:

EDWARD M. FLETCHER, JR.  
Attesting Officer

ROBERT GOTTSCHALK  
Commissioner of Patents